(12) United States Patent
Hopkins (10) Patent No.: US 7,583,682 B2
(45) Date of Patent: Sep. 1, 2009

(54) METHOD FOR IMPROVING PEER TO PEER NETWORK COMMUNICATION

(75) Inventor: Samuel P. Hopkins, Freedom, PA (US)

(73) Assignee: Tiversa, Inc., Cranberry Township, PA (US)

(*) Notice: Subject to any disclaimer, the term of this patent is extended or adjusted under 35 U.S.C. 154(b) by 525 days.

(21) Appl. No.: 11/040,364

(22) Filed: Jan. 21, 2005

(65) Prior Publication Data

US 2005/0163135 A1    Jul. 28, 2005

Related U.S. Application Data

(63) Continuation-in-part of application No. 10/764,111, filed on Jan. 23, 2004.

(51) Int. Cl.
H04L 12/28 (2006.01)
H04J 3/14 (2006.01)
H04J 1/16 (2006.01)
G08C 15/00 (2006.01)
G06F 11/00 (2006.01)

(52) U.S. Cl. ............... 370/401; 370/229; 370/238; 370/351; 709/203

(58) Field of Classification Search ......... 370/229–254, 370/315–395, 400–411; 709/227–229, 237–241, 709/203–221
See application file for complete search history.

(56) References Cited

U.S. PATENT DOCUMENTS 111,604 A    2/1871   Bailey
5,233,604 A * 8/1993  Ahmadi et al. ............ 370/238
5,600,638 A * 2/1997  Bertin et al. .............. 370/351
5,794,254 A   8/1998  McClain
5,949,760 A   9/1999  Stevens et al.

(Continued)

FOREIGN PATENT DOCUMENTS

EP    1107512 A1    6/2001

(Continued)

OTHER PUBLICATIONS

Oram, A., "Peer-to-Peer: Harnessing the Power of Disruptive Technologies", Ch. 19 Interoperablity Through Gateways, Mar. 2001, p. 381-392.

(Continued)

Primary Examiner—Man Phan
(74) Attorney, Agent, or Firm—Hamilton, Brook, Smith & Reynolds, P.C.

(57) ABSTRACT

The present invention relates to a node for deployment on a peer to peer network. The node is programmed for monitoring the network to receive communication messages therefrom and to forward the communication messages, optionally changing the communications radius parameters to an optimal or near optimal value. The node can forward messages from one network to another or from one network to the same network. The invention also provides a method for monitoring communication messages for selected objects by nodes on a peer to peer network. The method includes interposing the node on the network. The node has at least one stored object corresponding to a communication message object stored at the node; and monitors the network to detect communication messages matching at least one of the stored objects and decides whether or not to forward or change communication message radius parameters based on some defined programming or configuration.

3 Claims, 5 Drawing Sheets

U.S. PATENT DOCUMENTS

| | | | |
|---|---|---|---|
| 5,987,011 A | 11/1999 | Toh | |
| 6,069,896 A | 5/2000 | Borgstahl et al. | |
| 6,076,088 A | 6/2000 | Paik et al. | |
| 6,147,971 A * | 11/2000 | Rochberger et al. | 370/238 |
| 6,205,146 B1 * | 3/2001 | Rochberger et al. | 370/395.53 |
| 6,483,808 B1 * | 11/2002 | Rochberger et al. | 370/238 |
| 6,668,289 B2 | 12/2003 | Cheng et al. | |
| 6,732,180 B1 | 5/2004 | Hale et al. | |
| 6,839,769 B2 | 1/2005 | Needham et al. | |
| 6,855,660 B2 * | 2/2005 | Tsou et al. | 502/216 |
| 6,918,113 B2 | 7/2005 | Patel et al. | |
| 6,965,591 B1 * | 11/2005 | Roy | 370/352 |
| 6,983,320 B1 | 1/2006 | Thomas et al. | |
| 7,003,514 B2 * | 2/2006 | Dutta et al. | 707/5 |
| 7,010,534 B2 | 3/2006 | Kraft | |
| 7,089,301 B1 | 8/2006 | Labio et al. | |
| 7,120,145 B2 * | 10/2006 | Ohba et al. | 370/389 |
| 7,174,382 B2 | 2/2007 | Ramanathan et al. | |
| 7,177,295 B1 | 2/2007 | Sholander et al. | |
| 7,318,092 B2 | 1/2008 | Sutler | |
| 7,327,683 B2 | 2/2008 | Ogier et al. | |
| 2001/0003191 A1 | 6/2001 | Kovacs et al. | |
| 2002/0044549 A1 | 4/2002 | Johansson et al. | |
| 2002/0065832 A1 | 5/2002 | Mack | |
| 2002/0069089 A1 | 6/2002 | Schmidt | |
| 2002/0073204 A1 | 6/2002 | Dutta et al. | |
| 2002/0087885 A1 | 7/2002 | Peled et al. | |
| 2002/0138471 A1 | 9/2002 | Dutta et al. | |
| 2002/0143989 A1 | 10/2002 | Huitema et al. | |
| 2002/0152262 A1 | 10/2002 | Arkin et al. | |
| 2002/0161844 A1 * | 10/2002 | Overtoom | 709/208 |
| 2002/0181395 A1 | 12/2002 | Foster et al. | |
| 2002/0184310 A1 | 12/2002 | Traversat et al. | |
| 2003/0005035 A1 | 1/2003 | Rodgers | |
| 2003/0037167 A1 | 2/2003 | Garcia-Luna-Aceves et al. | |
| 2003/0050966 A1 * | 3/2003 | Dutta et al. | 709/203 |
| 2003/0050980 A1 | 3/2003 | Dutta et al. | |
| 2003/0055892 A1 | 3/2003 | Huitema et al. | |
| 2003/0078889 A1 | 4/2003 | Lee et al. | |
| 2003/0088544 A1 | 5/2003 | Kan et al. | |
| 2003/0095660 A1 | 5/2003 | Lee et al. | |
| 2003/0112823 A1 | 6/2003 | Collins et al. | |
| 2003/0182428 A1 | 9/2003 | Li et al. | |
| 2003/0191828 A1 | 10/2003 | Ramanathan et al. | |
| 2003/0195852 A1 | 10/2003 | Campbell et al. | |
| 2003/0202468 A1 | 10/2003 | Cain et al. | |
| 2003/0208621 A1 * | 11/2003 | Bowman | 709/242 |
| 2003/0212710 A1 | 11/2003 | Guy | |
| 2004/0030651 A1 | 2/2004 | Kim et al. | |
| 2004/0039921 A1 | 2/2004 | Chuang | |
| 2004/0044790 A1 * | 3/2004 | Loach et al. | 709/241 |
| 2004/0044996 A1 | 3/2004 | Atallah | |
| 2004/0098370 A1 | 5/2004 | Garland et al. | |
| 2004/0111604 A1 | 6/2004 | Fournier | |
| 2004/0122958 A1 * | 6/2004 | Wardrop | 709/229 |
| 2004/0143842 A1 | 7/2004 | Joshi | |
| 2004/0148434 A1 | 7/2004 | Matsubara et al. | |
| 2004/0153658 A1 | 8/2004 | Gunyakti et al. | |
| 2004/0158630 A1 | 8/2004 | Chang et al. | |
| 2004/0162871 A1 | 8/2004 | Pabla et al. | |
| 2004/0196784 A1 | 10/2004 | Larsson et al. | |
| 2004/0218532 A1 | 11/2004 | Khirman | |
| 2004/0230572 A1 | 11/2004 | Omoigui | |
| 2004/0236945 A1 | 11/2004 | Risan et al. | |
| 2004/0250106 A1 | 12/2004 | Annese et al. | |
| 2004/0250122 A1 | 12/2004 | Newton | |
| 2004/0260801 A1 | 12/2004 | Li | |
| 2005/0038898 A1 | 2/2005 | Mittig et al. | |
| 2005/0043548 A1 | 2/2005 | Cates | |
| 2005/0047390 A1 * | 3/2005 | Park et al. | 370/351 |
| 2005/0080858 A1 * | 4/2005 | Pessach | 709/206 |
| 2005/0091167 A1 | 4/2005 | Moore et al. | |
| 2005/0091397 A1 | 4/2005 | Roberts et al. | |
| 2005/0108203 A1 | 5/2005 | Tang et al. | |
| 2005/0108248 A1 | 5/2005 | Natunen | |
| 2005/0114709 A1 | 5/2005 | Moore | |
| 2005/0144288 A1 | 6/2005 | Liao | |
| 2005/0163050 A1 | 7/2005 | Hopkins | |
| 2005/0163133 A1 | 7/2005 | Hopkins | |
| 2005/0163135 A1 | 7/2005 | Hopkins | |
| 2005/0187942 A1 * | 8/2005 | Dutta et al. | 707/10 |
| 2005/0203851 A1 | 9/2005 | King et al. | |
| 2005/0229243 A1 | 10/2005 | Svendsen et al. | |
| 2005/0229255 A1 | 10/2005 | Gula et al. | |
| 2005/0265259 A1 | 12/2005 | Thubert et al. | |
| 2005/0267945 A1 | 12/2005 | Cohen et al. | |
| 2006/0034177 A1 | 2/2006 | Schrempp | |
| 2006/0209819 A1 | 9/2006 | Jennings et al. | |
| 2006/0248062 A1 | 11/2006 | Libes et al. | |

FOREIGN PATENT DOCUMENTS

| | | |
|---|---|---|
| WO | WO 03/009524 | 1/2003 |
| WO | WO 03/009524 A2 | 1/2003 |
| WO | WO 2005/074229 A1 | 8/2005 |
| WO | WO 2005/074230 A2 | 8/2005 |

OTHER PUBLICATIONS

Lindemann, C. et al., "A Distributed Search Service for Peer-to-Peer File Sharing in Mobile Applications", Peer-to-Peer Computing, 2002, Proceedings of the Second International Conference on Peer-to-Peer Computing, Sep. 5-7, 2002.

Findeli, M., "Peer-to-Peer (P2P) Networkgin", On Line, Jul. 1, 2001, p. 1-21.

Scarlata, V. et al., "Responder Anonymity and Anonymous Peer-to-Peer File Sharing", Proceedings of the International Conference on Network Protocols, Nov. 11, 2001, p. 272-280.

Xiao, L. et al., "Mutual Anonymity Protocols for Hybrid Peer-to-Peer Systems", Proceedings of the 23rd Intenrational Confernece on Distributed Computing Systems, May 19-22, 2003.

Mondal, A. et al., Effective load-balancing of peer-to-peer systems, Online, Mar. 2002, XP002299388.

Andersen, S. et al., Changes to Functionality in Microsoft Windows XP Service Pack 2 Part 2: Network Protection Technologies, Online, Sep. 15, 2004, p. 1-56, XP002330123.

Markatos, E.P., Tracing a large-scale peer to peer system: an hour in he life of Gnutella, Cluster Computing and the Grid 2nd IEEE/ACM International Symposium CCGRID2002 Berlin, Germany, May 21-24, 2002, IEEE Comput. Soc., US, p. 65-74.

Zupeng Li et al., "Research of Peer-to-Peer Network Architecture," Proceedings of ICCT2003, pp. 312-315.

Marmor, Michael S., "Make the P2P Lead with Toadnode," www.webtecniques.com, Dec. 2000, pp. 44-49.

Ueda, Kiyoshi et al., "Peer-to-Peer Network Topology Control within a Mobile Ad-hoc Network," 2003 IEEE, pp. 243-247.

Liu, Jiangchuan, et al., "Distributed Distance Measurement for Large-Scale Networks," Computer Networks 41 (2003) 177-192.

Siu Man Lui and Sai Ho Kowk, "Interoperability of Peer-To-Peer File Sharing," ACM SIGecom Exchanges, Vol. 3, No. 3, Aug. 2002, pp. 25-33.

Brandon Wiley, Freenet, "Inoperability Through Gateways," Chapter 19, pp. 381-392.

Zhenyun Zhuang et al., "Hyrid Periodical Flooding in Unstructured Peer-to-Peer Networks," Proceedings of the 2003 International Conference on Parallel Proceeding.

Steven Hessing, "Peer to Peer Messaging Protocol," Internet-Draft, Apr. 2002, pp. 1-57.

Shi, W., et al., "Tuxedo: a Peer/to/Peer Caching System," Department of Computer Science, Wayne University.

Hwang, J., and Aravamudham, P., "Proxy/based Middleware Services for Peer/to/Peer Computing in Virtually Clustered Wireless Grid Networks," School of Information Studies, Syracuse University, CST 4/291.

Kim, K., and Park, D., "Subway: Peer/to/Peer Clustering of Clients for Web Proxy," Department of Electrical Engineering and Computer Science, 8 pages, Retrieved from Internet on Dec. 29, 2006.

Goel, S., et al., "A Resilient Network That Can Operate Under Duress: To Support Communication Between Government Agencies during Crisis Situations," IEEE, Proceedings of the 37$^{th}$ Annual Hawaii International Conference pp. 1-11, Jan. 2004.

*Tiversa, Inc., et al* v. *Cohen & Grigsby, P.C.*, Civil Division, Case No. GD 07/001515, Court of Common Pleas of Allegheny County, Pennsylvania, "Complaint," 89 pages, dated Sep. 5, 2007.

*Tiversa, Inc., et al* v. *Cohen & Grigsby, P.C.*, Court of Common Pleas of Allegheny County, Pennsylvania, "Preliminary Objections and Brief in Support of Preliminary Objections," 18 pages, dated Oct. 15, 2007.

*Tiversa, Inc., et al* v. *Cohen & Grigsby, P.C.*, Court of Common Pleas of Allegheny County, Pennsylvania, "First Amended Complaint," 90 pages, dated Nov. 5, 2007.

*Tiversa, Inc., et al* v. *Cohen & Grigsby, P.C.*, Civil Division, Case No. GD 07/001515, Court of Common Pleas of Allegheny County, Pennsylvania, "Defendant's Preliminary Objections to First Amended Complaint and Brief in Support," 14 pages, dated Nov. 21, 2007.

*Tiversa, Inc., et al* v. *Cohen & Grigsby, P.C.*, Civil Division, Case No. GD 07/001515, Court of Common Pleas of Allegheny County, Pennsylvania, "Court Order re: Defendant's Preliminary Objections to First Amended Complaint and Brief in Support," 14 pages, dated Nov. 27, 2007.

*Tiversa, Inc., et al* v. *Cohen & Grigsby, P.C.*, Civil Division, Case No. GD 07/001515, Court of Common Pleas of Allegheny County, Pennsylvania, "Second Amended Complaint," 89 pages, dated Dec. 11, 2007.

*Tiversa, Inc., et al* v. *Cohen & Grigsby, P.C.*, Civil Division, Case No. GD 07/001515, Court of Common Pleas of Allegheny County, Pennsylvania, "Answer to Second Amended Complaint," 454 pages, dated Jan. 30, 2008.

*Tiversa, Inc., et al* v. *Cohen & Grigsby, P.C.*, Civil Division, Case No. GD 07/001515, Court of Common Pleas of Allegheny County, Pennsylvania, "Reply to New Matter," 16 pages, dated Feb. 19, 2008.

Goel, S. et al., "A Resilient Network That Can Operate Under Duress: To Support Communication Between Government Agencies During Crisis Situations," *In System Sciences 2004, Proceedings of the 37th Annual Hawaii International Conference on, Jan. 5-8, 2004*, Posted online: Feb. 26, 2004 10:51:19.0. (retrieved on Jun. 16, 2007) Retrieved from the Internet: URL:http://csd2.computer.org/comp/proceedings/hiscc/2004/2056/05/205650123a.dpf.

* cited by examiner

Fig 1

Prior Art

Fig 2

Prior Art

Fig 3

Prior Art

Fig 4

Prior Art

Prior Art

METHOD FOR IMPROVING PEER TO PEER NETWORK COMMUNICATION

RELATED PATENT APPLICATION

This application is a continuation in part of U.S. patent application Ser. No. 10/764,111, filed Jan. 23, 2004, entitled Method for Monitoring and Providing Information Over a Peer to Peer Network.

FIELD OF THE INVENTION

The present invention provides a method for peer to peer network communications, and, in particular, to connecting one or more peer to peer networks together and accepting communication messages from a node and providing the communication message to another node. The present invention may also change communication message radius parameters to increase the communication message radius of travel on the network.

BACKGROUND OF THE INVENTION

As used herein, peer to peer networks which are the subject of the present invention comprise multiple nodes, each node typically consisting both of file server and client, which can send and receive data or "Communication messages" to or from a node to which such is connected.

Figure 1:
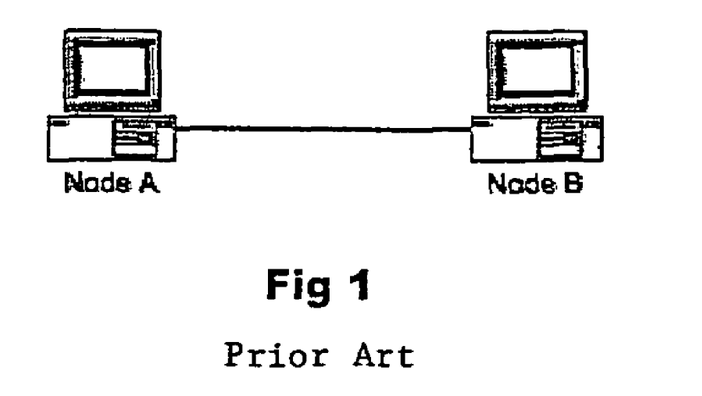
FIG. 1 is a simplified schematic of a two node peer to peer network.
Figure 2:
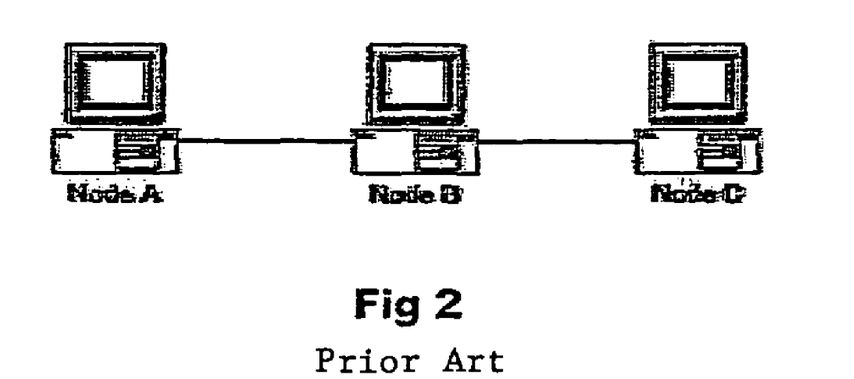
FIG. 2 is a simplified schematic of a peer to peer proxy network.
Figure 3:
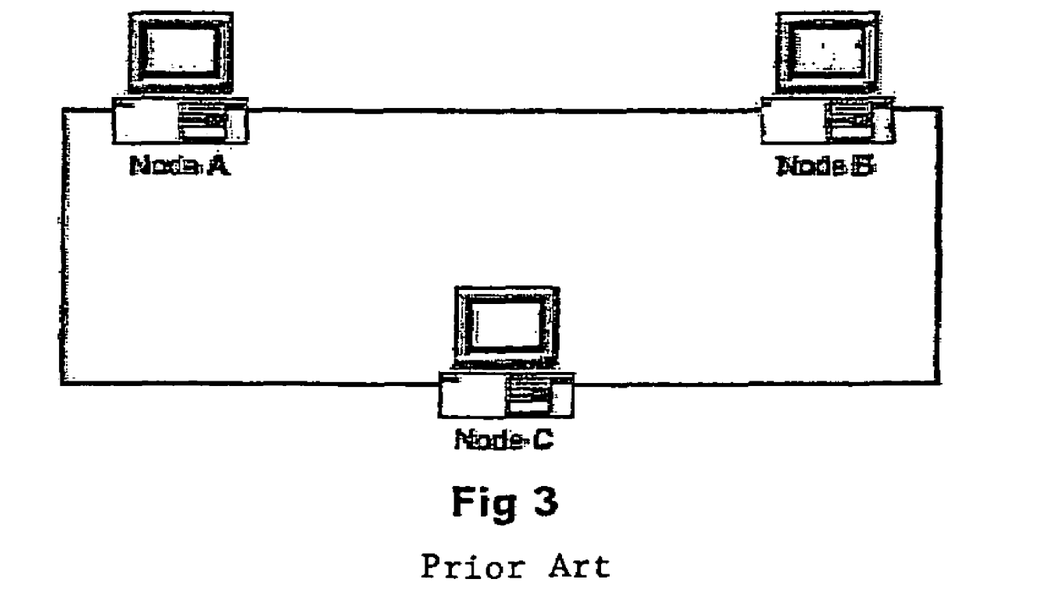
FIG. 3 is a simplified schematic view of a peer to peer, nonproxy, and loop network.

In a peer to peer network each node is connected to other nodes over a communication medium, such as the internet, either directly or through some type of proxy. For example, when a search request is issued such originating node sends a search request to all of the nodes to which it is connected. (see FIG. 1) These nodes search their list of available files and if a match is found they send a response back with the location. However, a peer to peer proxy network typically consists of node A which is connected to a node B and node B is connected to a node C (see FIG. 2). Node A is not directly connected to node C such that if node A issues a search request it will be forwarded to node B to search its available files and if a match is found it will send a response back to node A. Node B will then forward node A's request to node C and Node C will search its available files and if a match is found it will send a response back to node B. Node B will then forward this response to node A. FIG. 3 depicts a nonproxy loop network wherein each node is directly connected to another.

Figure 4:
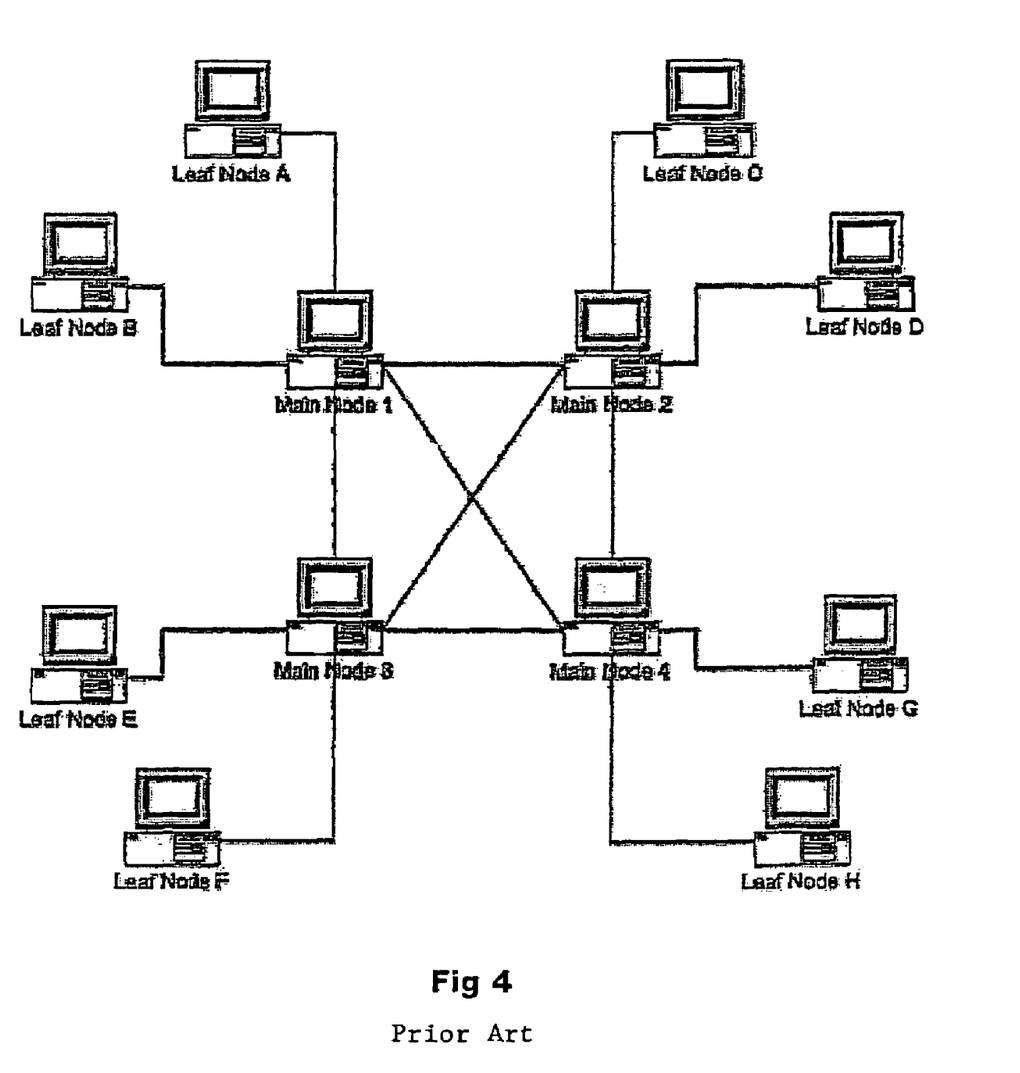
FIG. 4 is a simplified schematic of a peer to peer leaf/main node network.

Some peer to peer networks utilize a leaf node/main node proxy topology (see FIG. 4) where some nodes are classified as main nodes and the remaining nodes are classified as leaf nodes. Leaf nodes can only connect to main nodes. Only main nodes can connect to other main nodes. When a leaf node issues a search request it sends the request to the main node with which it is connected. The main node then forwards the request to any other leaf nodes that are connected to it and also to any main nodes to which it is connected. These main nodes forward the request to any leaf nodes that are connected to them.

In peer to peer networks, communication messages are sent to the nodes to which they are connected and, in turn, each of those nodes send the communication messages to other nodes to which they are connected.

Multiple peer to peer networks exist, usually each having a preferred set of attributes. Users wishing to utilize one peer to peer network for its specific attributes must install specific software to access the specific network. Often users wish to access multiple networks and therefore have multiple software applications installed on their computer. When the user wishes to search a specific network the user must start the specific software application and initiate the search. If the result is not satisfactory, the user must launch a second application and search a second peer to peer network. Thus, it would be advantageous if users could search one network using the software application of their choice and have their communication messages be forwarded to a second network automatically.

Figure 9:
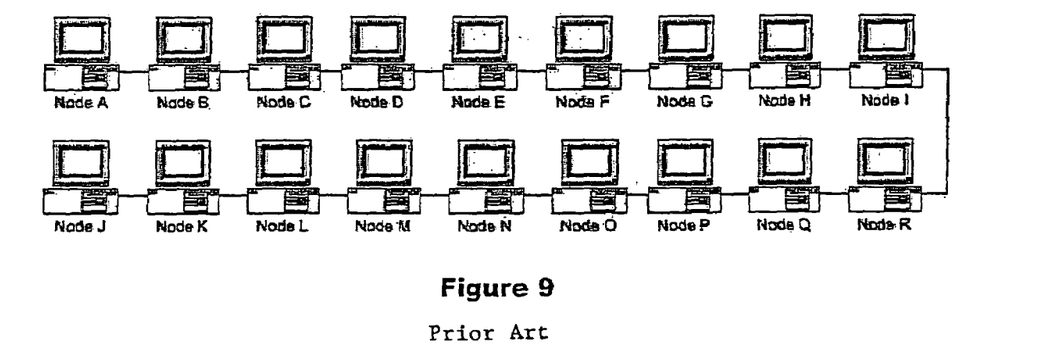
FIG. 9 is a simplified schematic of a large peer to peer network.

Referring to FIG. 9, a peer to peer network is depicted, but which is normally quite large. Often these networks comprise hundreds of thousands of nodes. To reduce the bandwidth required to operate such networks, nodes have a community imposed transmission distance or "Radius" limitation. Communication messages contain communication message radius parameters such as "hops" and time to live. Hops is a value that normally starts at 0 and increments each time the communication is forwarded. Time to live is a value that normally starts at 5 and is decremented each time the communication is forwarded. When hops reaches a preset limit, often 5, or time to live reaches 0, the communication is dropped from the network. Often nodes have a "Max time to live" setting this value is typically set to 5. If a node receives a communication message time to live which is higher than its configured max time to live, the packet is either dropped or the communication message time to live is dropped to the configured value in the max time to live. This effectively enforces a community time to live value and limits the number of nodes that would receive a communication message from a transmitting node. It would be advantageous if the communication message could travel some distance and then have its communication message radius parameters changed to an optimal or near optimal value to increase the distance the communication message could travel. For instance, a communication message could travel 4 hops and then have its settings changed back to 0.

Accordingly it is an object of the present invention to provide a method for improving peer to peer network communications. It is yet another object of the present invention to connect two or more peer to peer networks together and accept communication messages from one and provide it to another. It is yet another object of the present invention to accept communication messages from a peer to peer network and change the communication message radius parameters to an optimal or near optimal value and retransmit the communication message so that the radius or distance of the communication is extended.

SUMMARY OF THE INVENTION

Generally, the present invention provides a method for improving peer to peer network communications by utilizing at least one of the methods set forth below. The preferred method comprises:

For example, at least one improvement-node is placed into a peer to peer network. The improvement-node (a) may optionally connect a second time to the same or a different peer to peer network; (b) may accept communication messages from one network and forwarding it onto the same or another network, optionally setting the communication message radius parameters to an optimal or near optimal value. Additionally, the improvement-node may accept communication messages from one network and compare it to a set of definitions to make a decision to drop or forward the communication message. It may optionally set the communication message radius parameters to an optimal or near optimal value and forward the communication message.

Thus, the present invention provides a method for connecting one or more peer to peer networks together and accepting communication messages from one and providing it to another. The invention does not require that all communication messages be forwarded or that the improvement-node connect to multiple networks. In one such embodiment, the improvement-node only forwards search and search response communication messages while not forwarding other communication messages. In another embodiment, the improvement-node connects to the same network and accepts communication messages, changes the communication messages radius parameters to an optimal or near optimal value, and resends it on the same network. In another embodiment, the improvement-node accepts all communication messages and forwards all communication messages. In another embodiment the improvement-node accepts communication messages from one network and uses preconfigured information to decide if it should forward it onto another network. In yet another embodiment, the improvement-node accepts communication messages from a node on a network and issues new communication messages containing the same information onto the same network or different network on behalf of the original node.

In all of the embodiments, the improvement-node is configured to have one or more of the features set forth below. These features are employed in the method for improving peer to peer network communication to provide enhanced capabilities compared to the network nodes in the particular network being addressed. Thus, not all of the capabilities need to be programmed into each improvement-node in order to accept and forward communication messages. The presently preferred configurations include:

The improvement-node is configured to connect to the same network multiple times.

The improvement-node is configured to connect to multiple networks.

The improvement-node is configured to connect to multiple networks multiple times.

The improvement-node is configured to accept communication messages from one network and forward it to another.

The improvement-node is configured to accept communication messages from one network, change its communication message radius parameters, and resend the communication message on another network.

The improvement-node is configured to accept communication messages from one network, change the communication message radius parameters, and resend the communication messages on the same network.

The improvement-node is configured to make a decision to forward a communication message based on a preprogrammed configuration.

The improvement-node is configured to make a decision to change communication message radius parameters based on a preprogrammed configuration.

The improvement-node is configured to accept communication messages from one node, create new communication messages with the same information except changing the identification information to that of its own, forward the new communication messages onto the same or different network, receive responses to said new communication messages and forwarding response of new communication messages to the original node.

The improvement-node is configured to speak multiple protocols.

The improvement-node is configured to bridge together multiple networks.

The improvement-node is configured to route one network to another.

The improvement-node is configured to repeat a communication message to extend its distance of travel.

Other advantages of the present invention will become apparent from a perusal of the following detailed description of presently preferred embodiments of the invention taken in connection with the accompanying drawings.

DESCRIPTION OF PRESENTLY PREFERRED EMBODIMENTS

Figure 7:
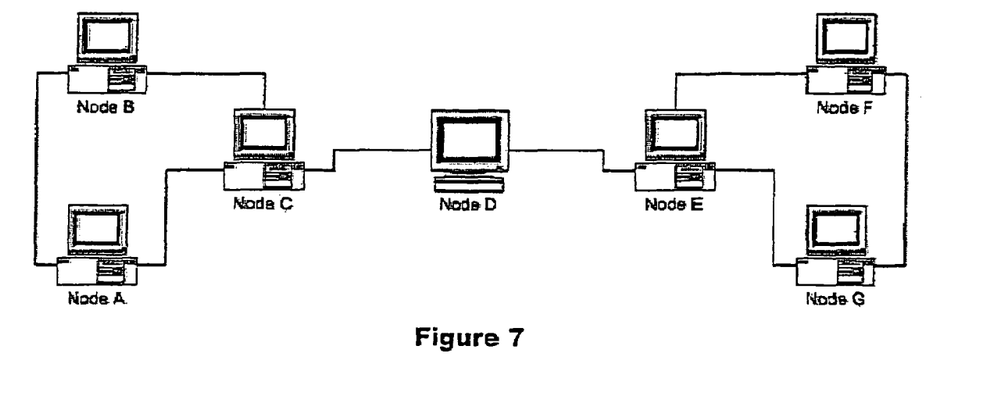
FIG. 7 is a simplified schematic of two peer to peer networks being connected together via an improvement-node.
Figure 8:
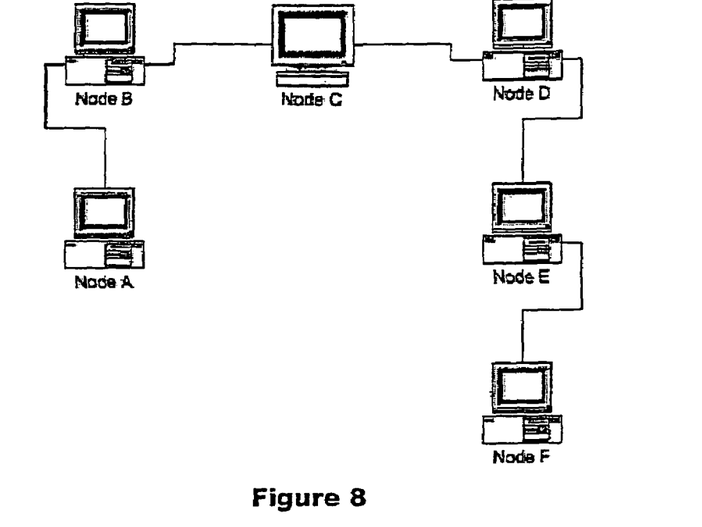
FIG. 8 is a simplified schematic of an improvement-node being used to reset communication message radius parameters.

With reference to FIGS. 7 and 8, the preferred methods of the present invention advantageously utilize at least one improvement-node. The improvement-node has certain preferred attributes and these attributes are configured for the specific type of communications improvement desired by the end user.

In one preferred embodiment of the present invention, an improvement-node comprises both a hardware system such as a computer, thin appliance, ASIC based device or other similar device, which can be programmed with specific logic or programming code (i.e., software). In the preferred embodiments, the device preferably has the capability of being connected with a physical network either directly or through the use of a gateway. The programming logic provides the device with the capability to transmit and receive on both physical networks as well as the peer to peer networks, which typically ride on top of a physical network. In the preferred embodiment of the invention, programming logic is a software program, but may also be hardcoded non-changeable procedural information such as typically found on an ASIC based device.

Figure 5:
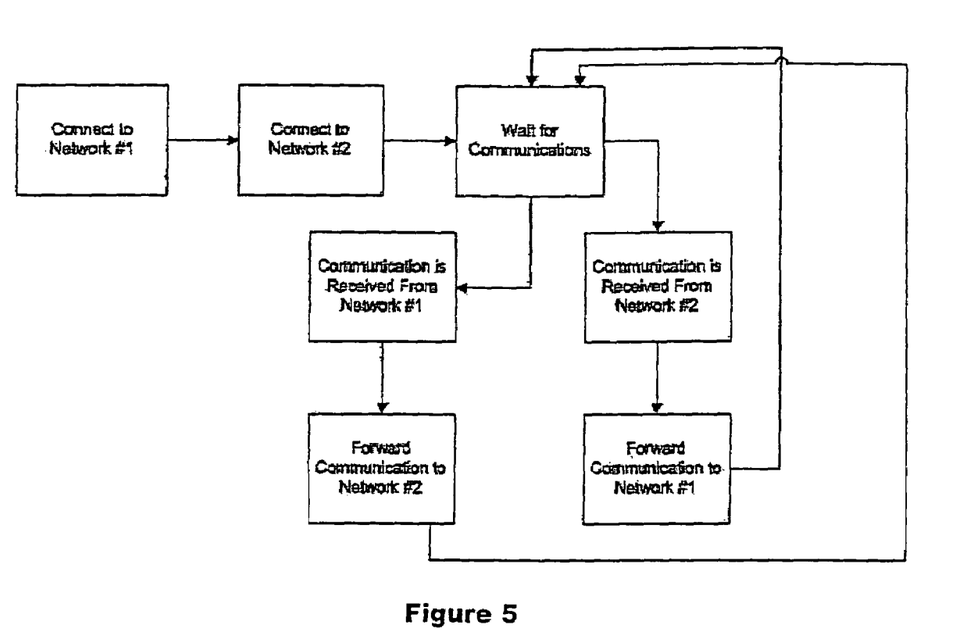
FIG. 5 is a flowchart representation of the programming or configuring an improvement-node to connect two networks together.

Referring generally to FIG. 5, a flow chart discloses one method for the programming logic that configures a device acting as an improvement-node to attach to two peer to peer networks. This improvement-node accepts communication messages from nodes participating on one network and forwards them onto another network.

Figure 6:
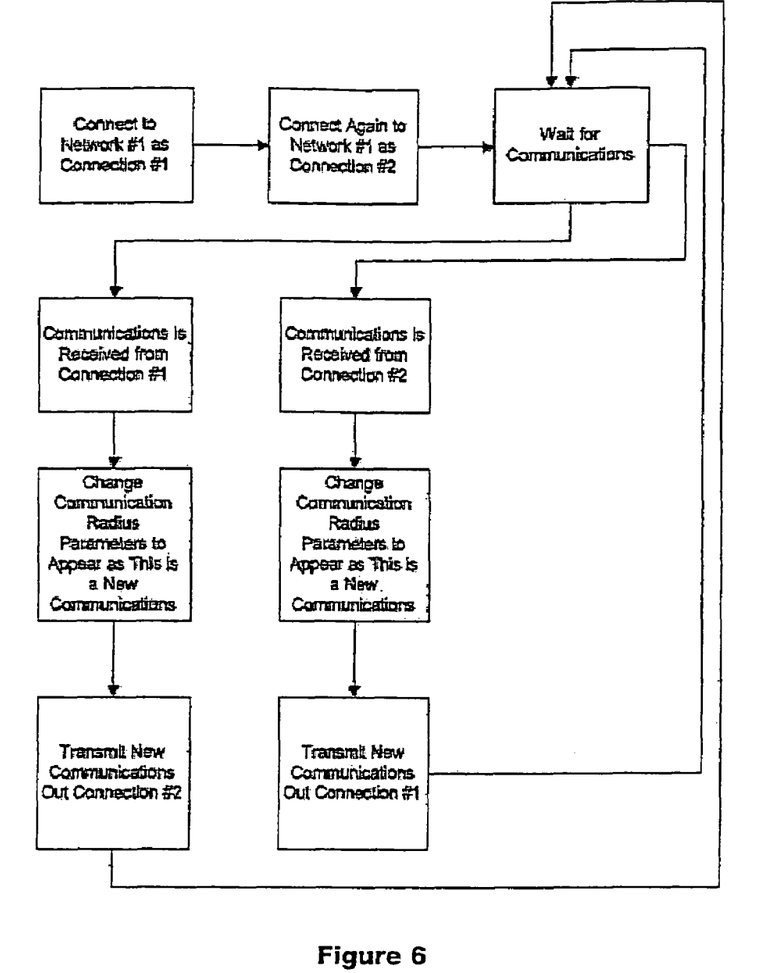
FIG. 6 is a flowchart representation of the programming or configuring an improvement-node to change the communication message radius parameters to an optimal or near optimal value.

Referring generally to FIG. 6, a flow chart discloses one method for the programming logic that configures a device acting as an improvement-node to attach to the same peer to peer network twice. This improvement-node accepts communication messages from nodes participating on the network, changes the communication message radius parameters, and forwards the communication messages onto the same network.

It may be advantageous to prevent transmission of communications from one network to the other, for instance if the operator of the improvement-node was trying to prevent copyright infringement requests from transversing the networks. In this case the programming logic can be configured to receive communication messages and compare them to criteria and to then perform some event whether or not a match is found. The programming logic may elect to drop the communication message and not pass it on to other networks. This election can be automatic depending on trigger points such as load or it can be configured to do so by the user of the programming logic.

The method for comparing may include inter string, complete string, partial string, fuzzy logic, patricia tree, or any other method that could be used to compare the likeness of two or more strings or portions of two or more strings. String comparison can occur in parallel with other searches to increase throughput or they can be compared serially (meaning one after another). If a match is made, the programming logic can drop the communication message if it is programmed to do so.

In one such embodiment the improvement-node only forwards search and search response communication message while not forwarding other communication messages. In this embodiment the improvement-node would accept the communication message, decide if it is a search or a response to a search and then forward on or drop the communication message based on its findings.

In another embodiment the improvement-node is functioning as a "repeater" so the communication message can travel further on the network then it normally would. In this case, the improvement-node would accept the communication message from a node or network and set the communication message radius parameters to an optimal or near optimal value and retransmit the communication message.

In another embodiment, the improvement-node accepts all communication messages and forwards all communication messages. In this embodiment, the improvement-node would accept all communication messages from one network and forward it to another network.

In another embodiment, the improvement-node accepts communication messages from a node and makes a request onto either the same network or a different network on behalf of the node. This would be useful in a caching environment or in an environment where the original node wished to hide its identity. The node would issue a communication message, which the improvement-node would accept. The improvement-node would replace the original communication message with one of its own, making it appear as though it is sending the communication message for the benefit of itself. The improvement-node would maintain a table of node communication messages to "on behalf of" communication messages. As communication messages or services were returned to the improvement-node, the improvement node would look in this table for a correlation. It would then forward the communication messages or services to the original node.

EXAMPLES

The following Examples illustrate various embodiments of the methods according to the present invention.

Example 1

Referring to FIG. 7, this example illustrates a method for connecting two networks together, accepting communication messages from one, and forwarding it to another.

In this example nodes A, B, and C are on a first network and nodes E, F, and G are on a second network. Each network is unable to communicate with each other because they speak different protocols. Node D is an improvement node and is part of both networks and can speak both protocols. Node A searches for a file named "A" and sends this search request to nodes B and C. Nodes B and C accept this search request. Node C forwards the search request to node D. Node D accepts the search request and forwards it to node E. Node E accepts the search request and forwards it to nodes F and G. Nodes F and G accept the search request. All nodes process the search request. Node G finds that it has the file and sends a response to node E. Node E forwards this response to node D. Node D forwards this response to node C. Node C forwards this response to node A. Node A receives the response from node G, which is on another network.

Example 2

Referring to FIG. 8, this example illustrates a method for accepting communication messages from nodes participating on a single network, changing the communication message radius parameters, and forwarding the communication messages onto the same network.

In this example, all nodes are on one network and node C is an improvement-node and is configured to accept any communication messages, change the communication message radius parameters to an optimal or near optimal value, and retransmit the communication messages.

Node A is configured to send a search request no further than 3 hops away from where it is connected into the network. It sends the search to node B. Node B accepts the search and increments its hop value to 1 and forwards it to node C. Node C accepts the search and resets the hop value to 0 and forwards the search to node D. Node D accepts the search and increments its hop value to 1 and forwards the search to node E. Node E receives the search and increments its hop value to 2 and forwards the search to node F. Node F accepts the search. All nodes process the search request. Node F finds that it has the file and generates a response with a hop value of 0 and sends the response to node E. Node E accepts the response and increments the hop value to 1 and forwards this response to node D. Node D accepts the response and increments the hop value to 2 and forwards the response to node C. Node C accepts the response and changes the hop value to 0. Node C forwards the response to node B. Node B accepts the response and increments the hop value to 1 and then forwards the response to node A. Node A accepts the response. The end result is that even though Node G was 5 hops away it was still able to communicate with Node A.

Example 3

Referring to FIG. 7, example 3 illustrates a method for connecting two networks together, accepting communication messages from one, comparing it a list of criteria and dropping the communication message if it matches or forwarding it if it doesn't.

In this example, nodes A, B, and C are on a first network and nodes E, F, and G are on a second network. Each network is unable to communicate with each other because they use different protocols. Node D is an improvement-node and is part of both networks and can operate with both protocols. Node D is configured to drop searches for "Madonna.txt". Node A searches for a file named "Madonna.txt" and sends this search request to nodes B and C. Nodes B and C accept this search request. Node C forwards the search request to node D. Since node D is configured to drop searches that match "Madonna.txt" and because node A searched for "Madonna.txt" node D drops the search.

Node A then searches for a file named "A" and sends this search request to nodes B and C. Nodes B and C accept the search request. Node C forwards the search request to node D. Since node D is configured to drop searches for "Madonna.txt" and because node A searched for "A" node D forwards the search request to node E. Node E accepts the search request and forwards it to nodes F and G. Nodes F and G accept the search request. All nodes process the search request. Node G finds that it has the file and sends a response to node E. Node E forwards this response to node D. Node D forwards this response to node C. Node C forwards this response to node A. Node A receives the response from node G which is on another network.

Example 4

Again, referring to FIG. 7, example 4 illustrates a method for connecting two networks together, accepting communication messages from one, and forwarding only searches and search responses and nothing else to another network.

In this example nodes A, B, and C are on a first network and nodes E, F, and G are on a second network. Each network is unable to communicate with each other because they use different protocols. Node D is an improvement-node and is part of both networks and can utilize both protocols. Node A searches for a file named "A" and sends this search request to nodes B and C. Nodes B and C accept this search request. Node C forwards the search request to node D. Node D accepts the search request and forwards it to node E. Node E accepts the search request and forwards it to nodes F and G. Nodes F and G accept the search request. All nodes process the search request. Node G finds that it has the file and sends a response to node E. Node E forwards this response to node D. Node D forwards this response to node C. Node C forwards this response to node A. Node A receives the response from node G which is on another network.

Node A then sends a ping request to nodes B and C. Node B receives the request and responds. Node C receives the request and responds. Node C forwards the ping request to node D. Because node D is configured to only forward search requests and responses it accepts the ping and responds, but it does not forward the ping.

Example 5

Referring to FIG. 7, example 5 illustrates a method for accepting communications from a node on a first network and forwarding the communications onto a second network while making it appear that the original communications came from the improvement-node when in fact it did not. For this example, refer to FIG. 7.

In this example, node D is the improvement node. Node C wishes to locate a file named "X" and sends a search request to node D. Node D accepts this search request and creates a new request with the same search terms, but with its own address information. Node D stores this request in a table so that it knows that if any requests are received it should forward them to node C. Node D forwards this request to node E. Node E accepts the search request and finds that it has a match. Node E generates a response with node D's address information and forwards the response to node D. Node D accepts the response and looks in it tables and finds that this response was meant for node C, so it forwards this response to Node C.

While presently preferred embodiments of the invention have been shown and described, the invention may be otherwise embodied within the scope of the appended claims.

What is claimed is:

1. A method of communicating over a peer to peer network, the method comprising the steps of:
   interposing at least one node on a peer to peer network;
   accepting a first communication message from a first node in the peer to peer network, the first message including information therein;
   creating a second communication message, the second communication message including the same information as the first communication message except for an identification information that is different from the first communication message;
   forwarding the second communication message to a second node in the peer to peer network;
   resetting a communication radius parameter of the second communication message to a value to increase the distance the communication message is expected to travel in response to an expiration of the communication message radius parameter, prior to forwarding the second communication message; and
   forwarding the response to the first node.

2. A method of communicating over a peer to peer network communications, the method comprising the steps of:
   interposing at least one node on a peer to peer network;
   connecting to first and second peer to peer networks;
   accepting communication messages from the first network;
   creating new communication messages with the same information and new identification information to replace the accepted messages;
   forwarding the new communication messages onto the second network;
   resetting a communication radius parameter to a value to increase the distance the communication message is expected to travel in response to an expiration of the communication message radius parameter, prior to forwarding the new communication messages to the second network;
   receiving responses to the new communication messages; and
   forwarding the responses of the new communication messages to an original node of the first network.

3. A method as set forth in claim 2 wherein the at least one node hides the identity of the original node.

* * * * *

UNITED STATES PATENT AND TRADEMARK OFFICE
CERTIFICATE OF CORRECTION

PATENT NO.        : 7,583,682 B2                                                           Page 1 of 1
APPLICATION NO.   : 11/040364
DATED             : September 1, 2009
INVENTOR(S)       : Samuel P. Hopkins It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Fourteenth Day of September, 2010

David J. Kappos
*Director of the United States Patent and Trademark Office*